(12) United States Patent
Noguchi et al.

(10) Patent No.: US 10,592,025 B2
(45) Date of Patent: Mar. 17, 2020

(54) DISPLAY DEVICE

(71) Applicant: Japan Display Inc., Tokyo (JP)

(72) Inventors: Koji Noguchi, Tokyo (JP); Takafumi Suzuki, Tokyo (JP); Michita Kudo, Tokyo (JP)

(73) Assignee: Japan Display Inc., Tokyo (JP)

( * ) Notice: Subject to any disclaimer, the term of this patent is extended or adjusted under 35 U.S.C. 154(b) by 48 days.

(21) Appl. No.: 15/692,514

(22) Filed: Aug. 31, 2017

(65) Prior Publication Data

US 2018/0059844 A1 Mar. 1, 2018

(30) Foreign Application Priority Data

Aug. 31, 2016 (JP) .................. 2016-169777

(51) Int. Cl.
*G06F 3/041* (2006.01)
*G06F 3/044* (2006.01)
*G02F 1/1333* (2006.01)
*G02F 1/1343* (2006.01)

(52) U.S. Cl.
CPC .......... *G06F 3/0412* (2013.01); *G02F 1/1343* (2013.01); *G02F 1/13338* (2013.01); *G06F 3/044* (2013.01); *G06F 3/0414* (2013.01); *G02F 1/133308* (2013.01); *G06F 2203/04112* (2013.01)

(58) Field of Classification Search
CPC .................................................. G06F 3/0414
See application file for complete search history.

(56) References Cited

U.S. PATENT DOCUMENTS

| 7,315,123 | B2* | 1/2008 | Hur .......................... H01J 11/12 |
| | | | 313/306 |
| 9,263,506 | B2* | 2/2016 | Kim ..................... H01L 27/3258 |
| 9,811,226 | B2* | 11/2017 | Itaya ....................... G06F 3/044 |
| 2009/0194404 | A1* | 8/2009 | Kubo .................... G06F 3/0414 |
| | | | 200/5 D |
| 2012/0198945 | A1* | 8/2012 | Yoneyama ............. B25J 13/083 |
| | | | 73/862.042 |
| 2012/0218494 | A1 | 8/2012 | Nakayama et al. |
| 2013/0021285 | A1* | 1/2013 | Kimura ............... G02F 1/13338 |
| | | | 345/173 |
| 2013/0021295 | A1* | 1/2013 | Kimura ............... G02F 1/13338 |
| | | | 345/174 |

(Continued)

FOREIGN PATENT DOCUMENTS

JP   2009-169523 A   7/2009
JP   2012-177798 A   9/2012

*Primary Examiner* — William Boddie
*Assistant Examiner* — Bipin Gyawali
(74) *Attorney, Agent, or Firm* — K&L Gates LLP (57) ABSTRACT

According to one embodiment, a display device includes a display panel including a first substrate including a display area and a first detection electrode, and a second force sensing electrode opposing the display area and the first detection electrode with a gap therebetween. The second force sensing electrode includes a central portion opposing a central portion of the display region, a peripheral portion located to surround the central portion and a reinforcing structure which reinforces the peripheral portion, and the gap between the central portion and the first detection electrode is greater than a gap between the peripheral portion and the first detection electrode.

12 Claims, 10 Drawing Sheets

(56) References Cited

U.S. PATENT DOCUMENTS

| | | | |
|---|---|---|---|
| 2014/0266814 A1* | 9/2014 | Hu | G06F 3/0202 |
| | | | 341/26 |
| 2016/0224168 A1* | 8/2016 | Watanabe | G06F 3/0414 |
| 2017/0277317 A1* | 9/2017 | Lee | G02F 1/13338 |
| 2017/0322662 A1* | 11/2017 | Hsieh | G02B 6/0088 |
| 2017/0351339 A1* | 12/2017 | Kawaguchi | G06F 3/02 |
| 2017/0372122 A1* | 12/2017 | Shim | G06F 3/0414 |
| 2018/0018039 A1* | 1/2018 | Lee | G06F 3/0414 |
| 2018/0018045 A1* | 1/2018 | Choi | G06F 3/044 |
| 2018/0059480 A1* | 3/2018 | Noguchi | G02F 1/13338 |
| 2018/0218859 A1* | 8/2018 | Ligtenberg | G06F 1/1616 |
| 2018/0233541 A1* | 8/2018 | Zeng | G06F 3/0412 |

\* cited by examiner

DISPLAY DEVICE

CROSS-REFERENCE TO RELATED APPLICATIONS

This application is based upon and claims the benefit of priority from Japanese Patent Application No. 2016-169777, filed Aug. 31, 2016, the entire contents of which are incorporated herein by reference.

FIELD

Embodiments described herein relate generally to a display device.

BACKGROUND

In recent years, liquid crystal display devices and organic electroluminescent (EL) display devices are widely used as display devices of a smartphone, personal assistant device (PAD), tablet computer, car navigation system, and the like. With regard to the display devices, a display device provided with a force sensing function of sensing a pressing force applied on the display surface to thereby carry out an arbitrary operation has been proposed. Such a display device adopts an input detection mode of an electrostatic capacitance system of detecting a pressing force, in which a change in a distance between two electrodes provided in the liquid crystal display device is converted into a change in electrostatic capacitance. It is preferable for such a liquid crystal display device that the distance between the two electrodes linearly changes with respect to the pressing force in a thickness direction (an external force in a thickness direction). Further, one electrode is moved or displaced toward the other electrode, the inter-electrode distance changes. Therefore, in order to detect a large pressing force, it is necessary to secure sufficient amount of displacement of the electrode (the amount of stroke).

In the display device comprising a force sensing function utilizing the difference in capacitance between two electrodes as mentioned above, if electrodes are formed thin to slim down the body, one electrode may be curved towards another. In such case, the distance between electrodes, in particular, the inter-electrode distance between the central portions is decreased, thereby making it difficult to secure a sufficient amount of displacement (amount of stroke) between electrodes.

SUMMARY

The present disclosure generally relates to a display device.

According to one embodiment, a display device includes a display panel including a first substrate including a display area and a first detection electrode, and a second force sensing electrode opposing the display area and the first detection electrode with a gap there between. The second force sensing electrode includes a central portion opposing a central portion of the display region, a peripheral portion located to surround the central portion and a reinforcing structure which reinforces the peripheral portion, and the gap between the central portion and the first detection electrode is greater than a gap between the peripheral portion and the first detection electrode.

Additional features and advantages are described herein, and will be apparent from the following Detailed Description and the figures.

DETAILED DESCRIPTION

Various embodiments will be described hereinafter with reference to the accompanying drawings. In general, according to one embodiment, a display device comprises: a display panel comprising a first substrate including a display area and a first detection electrode; a second force sensing electrode opposing the display area and the first detection electrode with a gap therebetween and comprising a central portion opposing a central portion of the display region, a peripheral portion located to surround the central portion and a reinforcing structure which reinforces the peripheral portion, the gap between the central portion and the first detection electrode being greater than a gap between the peripheral portion and the first detection electrode.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes, etc., of the respective parts are illustrated in the drawings schematically, rather than as an accurate representation of what is implemented. However, such schematic illustration is merely exemplary, and in no way restricts the interpretation of the invention. In addition, in the specification and drawings, the same structural elements as those described in connection with preceding drawings are denoted by like reference numbers, detailed description thereof being omitted unless necessary.

First Embodiment

Figure 1:
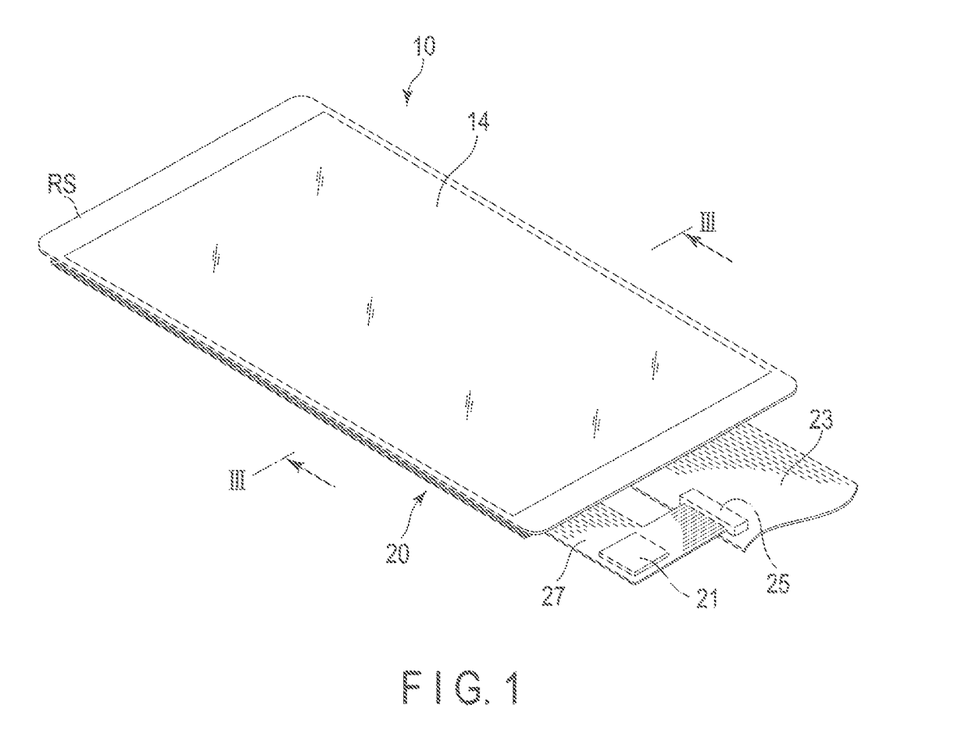
FIG. 1 is a perspective view showing the display surface side of a liquid crystal display device according to a first embodiment.
Figure 2:
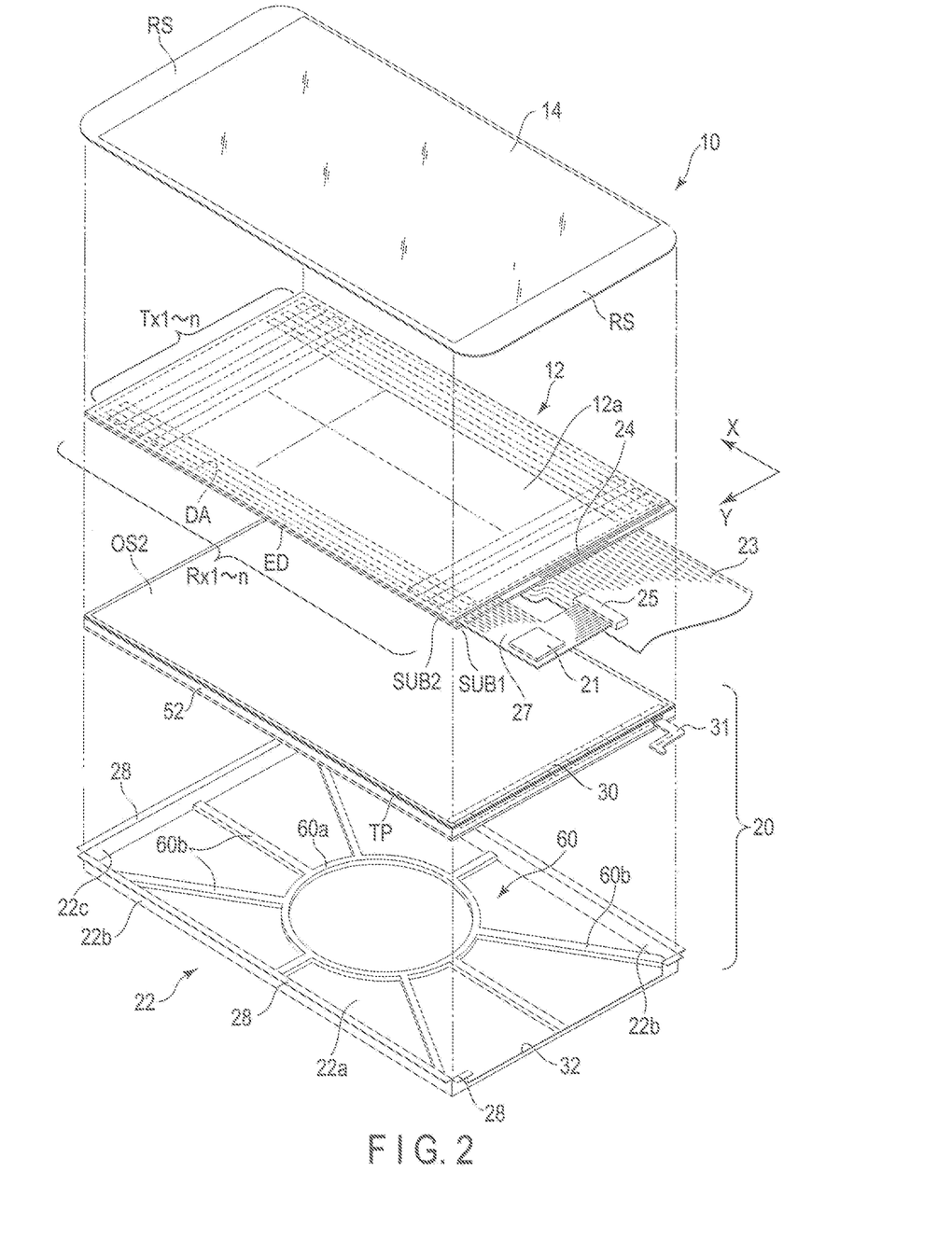
FIG. 2 is an exploded perspective view of the liquid crystal display device.

FIG. 1 is a perspective view showing the display surface side of a liquid crystal display device according to the first embodiment, and FIG. 2 is an exploded perspective view of the liquid crystal display device.

A liquid crystal display 10 can be incorporated into various kinds of electronic devices such as smartphones, tablet computers, mobile phones, notebook computers, portable game consoles, electronic dictionaries, television sets, vehicle-navigation systems and vehicle-mounted display panels, to be used.

As shown in FIGS. 1 and 2, the liquid crystal display 10 comprises an active-matrix liquid crystal panel (display panel) 12, a transparent cover panel 14 overlaid on a display surface 12a which is one surface of the liquid crystal panel 12 and configured to cover the entire display surface 12a, and a backlight unit (backlight device) 20 provided on the rear side of the liquid crystal panel 12 equivalent to the other surface of the liquid crystal panel 12 so as to face the rear side. The cover panel 14 may be omitted according to the circumstances of use.

Figure 3:
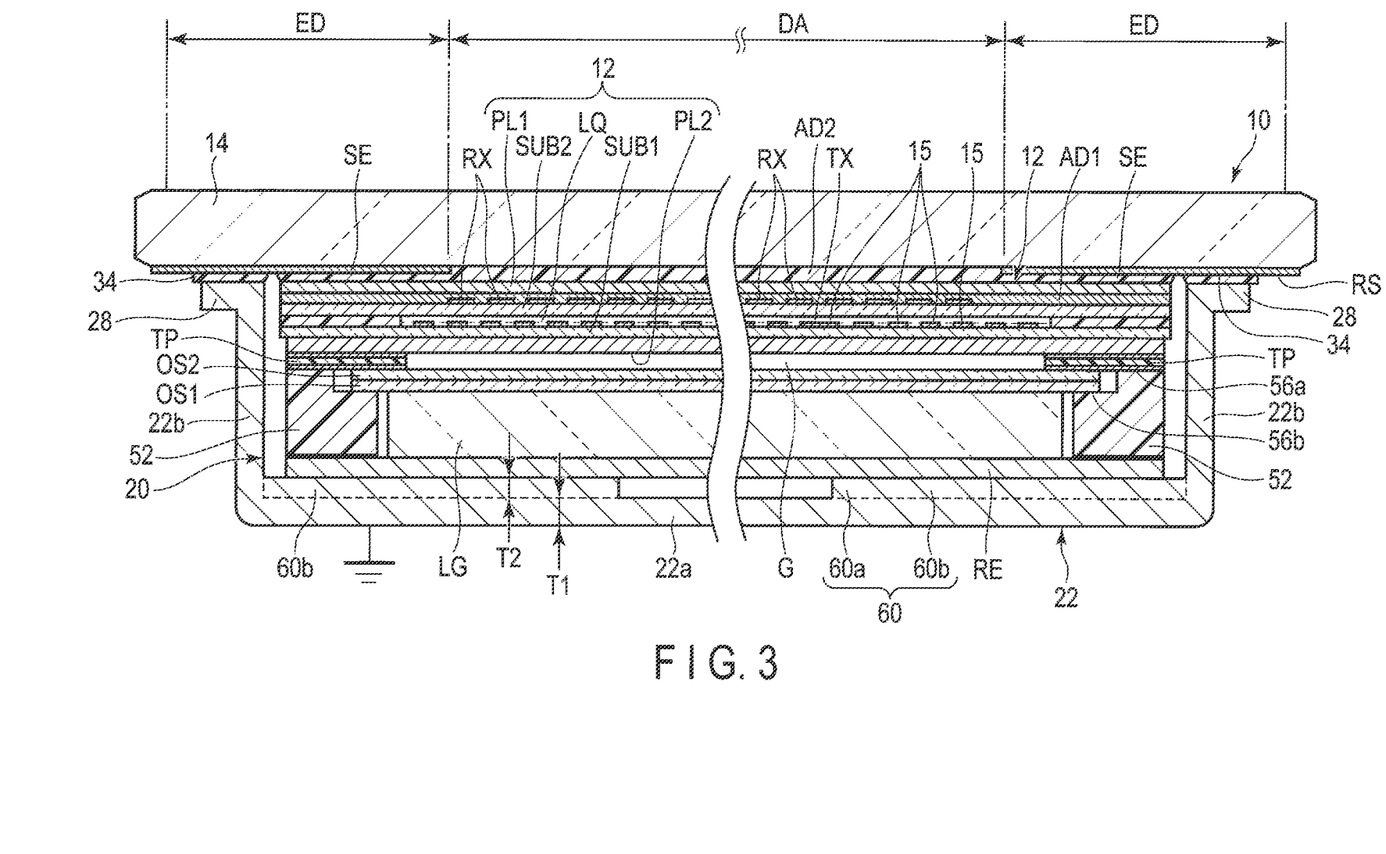
FIG. 3 is a cross section of the liquid crystal display taken along line III-III of FIG. 1.

FIG. 3 is a cross-sectional view of the liquid crystal display device along line A-A of FIG. 1. As shown in FIGS. 2 and 3, the liquid crystal panel 12 comprises a rectangular first substrate SUB1, a rectangular second substrate SUB2 opposing the first substrate SUB1, and a liquid crystal layer LQ sealed in between the first substrate SUB1 and the second substrate SUB2. The circumferential portion of the second substrate SUB2 is attached to the first substrate SUB1 with a sealing member SE. A polarizer PL1 is attached to the surface of the second substrate SUB2 to form the display surface 12a of the liquid crystal panel 12. A polarizer PL2 is attached to a surface (the rear surface of the liquid crystal panel 12) of the first substrate SUB1.

A plurality of electrode parts 15 such as a pixel electrode and a common electrode, and wiring lines (not shown), etc., are formed on at least one substrate, for example, on an inner surface of the first substrate SUB1. In this embodiment, a common electrode Vcom function also as a plurality of first detection electrodes Tx1 to Txn which constitute a touch sensor and a force detection sensor. The first detection electrodes Tx1 to Txn are formed into a stripe shape and each extend along a longitudinal direction of the first substrate SUB1 (a first direction X). Further, the first detection electrodes Tx1 to Txn are arranged parallel to each other with predetermined gaps therebetween along a width direction (a second direction Y) orthogonally crossing the longitudinal direction. On an upper surface of the second substrate SUB2, a plurality of second touch detection electrodes Rx1 to Rxn which constitute a touch sensor are formed. The second touch detection electrodes Rx1-Rxn are formed in a stripe shape and each extend along a width direction of the second substrate SUB2 (the second direction Y), that is, the direction orthogonally crossing an extending direction of the first detection electrodes Tx1 to Txn. The second touch detection electrodes Rx1-Rxn are arranged parallel to each other with predetermined gaps therebetween along the longitudinal direction of the second substrate SUB2. Note that the first detection electrodes Tx1 to Txn and the second touch detection electrodes Rx1 to Rxn are formed as transparent electrodes each formed from, for example, ITO.

The Polarizer PL1 is attached to the upper surface of the second substrate SUB2 to be overlaid on the second touch detection electrodes Rx1 to Rxn, with an adhesion member AD1 made from, for example, an optical transparent resin.

Incidentally, the self-sensing mode is known, in which electrodes Vcom of a liquid crystal panel are arranged in a matrix, and contact (approach or touch) of a finger is detected by sensing the electrodes arranged in a matrix. This mode can be easily possible applied to the liquid crystal panel 12.

On the liquid crystal panel 12, a rectangular display area (active area) DA is provided in a region of an inner side of the sealing member SE as the liquid crystal panel 12 is seen in plan view (in other words, when the liquid crystal panel is seen from the normal direction of the display surface of the liquid crystal panel). Images are displayed on the display area DA. A rectangular frame area (non-display region) ED is provided around the display area DA. The liquid crystal panel 12 is of a transmissive type having a transmissive display function of displaying images by selectively transmitting the light from the backlight unit 20 to the display area DA. The liquid crystal panel 12 may have a structure provided for the lateral electric field mode which mainly utilizes a lateral electric field parallel to the main surface of the substrate, or a structure provided for the vertical electric field mode which mainly utilizes a vertical electric field crossing the main surface of the substrate.

The cover panel 14 is formed of a glass plate or acrylic transparent resin into the shape of a rectangular plate. On the peripheral portion of the rear surface of the cover panel 14 (on a liquid crystal panel 12 side), a frame-shaped light-shielding layer RS is formed. The rear surface of the cover panel 14 is attached to the polarizer PL1 with an adhesive member AD2 formed from an optical transparent resin, for example, to cover the entire surface of the display surface 12a. In the cover panel 14, the regions other than that opposes the display area DA of the liquid crystal panel 12 are shielded by the light-shielding layer RS.

As shown in FIG. 1 and FIG. 2, a semiconductor device such as a drive IC 24 is mounted to a short-side end of the first substrate SUB1 as a signal supply source which supplies signals required to drive the liquid crystal panel 12. The drive IC 24 is formed into a slender rectangular shape and mounted on the first substrate SUB1 along a short-edge of the second substrate SUB2. The drive IC 24 supplies video signals and drive signals to the wiring lines and the pixel electrodes, and touch-detection drive signals to the first detection electrodes Tx1 to Txn. Further, a first flexible printed circuit substrate (FPC) 23 is joined to a short-side end of the first substrate SUB1, so as to extend from the liquid crystal panel 12 to the outside. The first FPC 23 is electrically connected to the drive IC 24 via a plurality of wiring lines (not shown) on the first substrate SUB1. A connector 25 may be mounted on the first FPC 23.

A second flexible printed circuit substrate (FPC) 27 is joined to the short side end of the second substrate SUB2. The second FPC 27 is electrically connected to second touch detection electrodes Rx1 to Rxn formed on the second substrate SUB2. A touch drive IC (detection drive element) 21 is mounted on the second FPC 27. Further, the extending end of the second FPC 27 is connected to the connector 25 on the first FPC 23, and electrically connected to the drive IC 24 through the connector 25 and the first FPC 23. The touch drive IC 21 contains a detector. The detector receives detection signals sent from the second detection electrodes Rx1 to Rxn through the second FPC 27 in a touch detection period.

As shown in FIG. 2 and FIG. 3, the backlight unit 20 comprises a rectangular case (or bezel) 22, a reflective sheet RE disposed on a bottom of the case 22, a plurality of optical elements arranged in the case 22, and a light source unit 30 which supplies light entering the optical elements. In this embodiment, the case 22 is included as structural elements of the backlight unit 20, but the structure is not limited to this. For example, the case 22 may be handled as components independent from the backlight unit 20.

The case 22 is formed into a rectangular lid shape from a metal plate. The case 22 is formed, for example, from a stainless sheet having a thickness of 0.05 to 1.0 mm by processing such as folding, pressing or drawing. The case 22 includes a rectangular bottom wall 22a having dimensions (length and width) greater than those of the liquid crystal panel 12 and less than those of the cover panel 14, a pair of long-sidewalls 22b, a pair of short-sidewalls 22c, provided to stand on the respective side edges of the bottom wall 22a, and flanges 28 extending outwards from upper end edges of the sidewalls.

In this embodiment, the pair of long-sidewalls 22b and the pair of short-sidewalls 22c are formed to stand to be substantially perpendicular to the bottom wall 22a. The height of the sidewalls 22b and 22c is slightly greatly rather than a total of the thickness of the liquid crystal panel 12, and the thickness of the backlight unit 20. The flanges 28 each extend outwards to be substantially perpendicular to the sidewalls 22b and 22c. In this embodiment, the flanges 28 are formed to have a width W, by which a sufficient adhesive strength can be obtained, that is, for example, 0.7 to 1 mm. In this embodiment, the bottom wall 22a, the sidewalls 22b and 22c and the flanges 28 are formed by folding one sheet metal.

A notch 32 is formed in one short-sidewall 22c. The first FPC 23 and the second FPC 27, described above, extend outwards through the notch 32.

The case 22 is fixed to the cover panel 14 by attaching the flanges 28 to the lower surface of the cover panel 14 with a double-sided tape 34, so as to cover the liquid crystal panel 12. The flanges 28 of the sidewalls 22b and 22c are fixed to the peripheral edges of the lower surface of the cover panel 14 on an outer side of the liquid crystal panel 12, and are aligned along the respective sides of the cover panel 14. The bottom wall 22a is placed to be substantially parallel to the back surface of the liquid crystal panel 12 while opposing thereto with a gap therebetween. The bottom wall 22a is connected to the ground potential to form a second force sensing electrode (second detection electrode). That is, the bottom wall 22a opposes the first detection electrodes Tx1 to Txn via the optical members of the backlight unit 20 and the first substrate SUB1. The second force sensing electrode (the bottom wall 22a) is electrically connected to the touch drive IC 21 to transmit detection signals containing capacitance variation to the touch drive IC 21.

Note that for the fixation of the case 22 and the cover panel 14, a hot melt adhesive, an epoxy adhesive, a UV-curing adhesive or the like maybe used, besides the double-stick tape 34.

Figure 4:
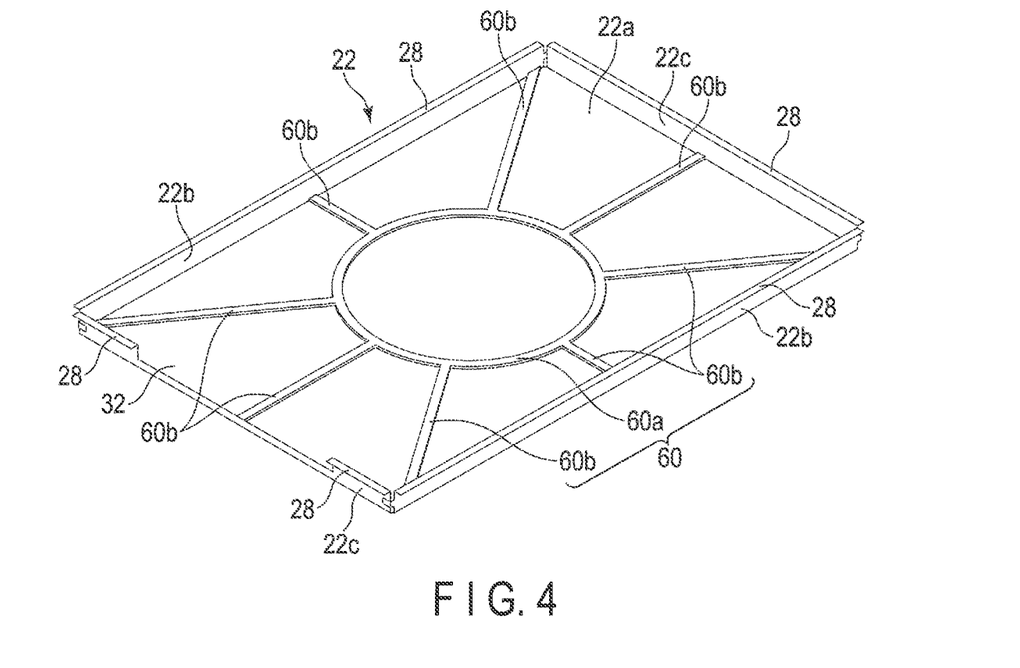
FIG. 4 is a perspective view showing a case of the liquid crystal display device.

FIG. 4 is a perspective view showing the bottom wall and inner surface side of the case 22. As shown in FIGS. 2 to 4, the bottom wall 22a which functions as the second pressure sensing electrode includes a reinforced structure to suppress deformation and warping towards the liquid crystal panel 12. In this embodiment, a reinforcing rib 60 provided for the bottom wall 22a is used as the reinforcing structure. The reinforcing rib 60 is formed on the inside (inside which counters the liquid crystal panel 12) of the bottom wall 22a.

The reinforcing rib 60 includes, for example, a circular or elliptical annular rib 60a provided around the central portion of the bottom wall 22a and a plurality of radial ribs 22b linearly extending respectively from the annular rib 60a to the respective side edges of the bottom wall 22a as seen in plan view. When a thickness T1 of the bottom wall 22a is 0.1 mm, for example, the reinforcing rib 60 is formed to have a height (thickness) T2 of about 0.1 to 0.2 mm.

The reinforcing rib 60 may be formed integrally with the bottom wall 22a as one body from a common metal with that of the bottom wall 22a by pressing, etching or the like, or they may be formed as separate bodies from a metal or a synthetic resin, and laid and adhered onto the bottom wall 22a. Moreover, the reinforcing rib 60 may be formed by printing resin on the inner surface of the bottom wall 22a.

With the reinforcing rib 60 described above, the peripheral portion of the bottom wall 22a can be reinforced to suppress warpage or bending of the bottom wall 22a. The reinforcing rib 60 is not formed in the central portion of the bottom wall 22a in plan view, the interval between the liquid crystal panel 12 and the central portion of the bottom wall 22a, i.e., the interval between the first detection electrodes Tx and the bottom wall 22a, can be reserved larger as compared with the portion of the reinforcing rib 60.

As shown in FIGS. 2 and 3, the back light unit 20 comprises a rectangular reflective sheet RE disposed on the bottom wall 22a, a rectangular frame 52 fixedly overlaid on the peripheral portion of the reflective sheet RE, a rectangular plate-shaped light guide LG overlaid on the reflective sheet RE within the frame 52, a plurality of, for example, two optical sheets OS1 and OS2 stacked on the light guide LG, and the light source unit 30 which inputs light to the light guide LG.

The reflective sheet RE has outer dimensions substantially equal to those of the plane of the liquid crystal panel 12, and covers substantially the entire surfaces of the bottom wall 22a. The reflective sheet RE have a thickness of 200 μm or less, preferably, 50 to 90 μm and a reflectance of 90% or higher, preferably, 95% or higher.

The frame 52 is formed by, for example, molding a synthetic resin such as polycarbonate. Outer dimensions of the frame 52 are substantially equal to those of the polarizer PL2 of the liquid crystal panel 12. The frame 56 includes an end surface 56a located on an opposite side to the reflective sheet RE and a one-step lower stepped portion 56b formed on an inner circumference side of the end surface 56a.

The light guide LG is formed to have outer dimensions (length, width) slightly less than inner dimensions of the frame 56, and also slightly greater then outer dimensions of the display area DA of the liquid crystal panel 12 in planer view. The light guide LG is disposed in the frame 56 with a reflective surface side opposing the reflective sheet RE and laid on the reflective sheet RE. The light guide LG used here has a thickness of about 0.23 to 0.32 mm.

The incident surface of the light guide LG opposes a short side of the frame 56 with a slight gap therebetween. The light source unit 30 comprises, for example, a belt-shaped circuit board and a plurality of light sources (for example, LEDs) arranged on the circuit board. The light source unit 30 is placed within the frame 56 so that the light sources oppose the incident surface of the light guide LG.

According to this embodiment, light-transmissive diffusion and prism sheets, formed from, for example, an acrylic or silicon synthetic resin are used as a first optical sheet OS1 and a second optical sheet OS2. The first optical sheet OS1 is overlaid on the emission surface of the light guide LG. The peripheral portion of the first optical sheet OS1 is laid on the stepped portion 56c of the frame 56. The second optical sheet OS2 is overlaid on the first optical sheet OS1, and further the peripheral portion of the second optical sheet OS2 is placed on the stepped section 56c of the frame 56 while being overlaid on the first optical sheet OS1. An upper surface of the peripheral portion of the second optical sheet OS2 is arranged on the same plane as that of the first end surface 56a of the frame 56, that is, located to be flush with the first end surface 56a. The number of optical sheets is not limited to two, but may be one, or three or more.

The backlight unit 20 comprises a rectangular frame shaped adhesive member (for example, double-sided tape) TP to attach the backlight unit 20 onto the liquid crystal panel 12. The adhesive member TP is attached to the first end surface 56a of the frame 56 and the peripheral portion of the second optical sheet OS2. Thus, the second optical sheet OS2 is fixed to the frame 56 via the adhesive member TP.

The backlight unit 20 configured as above is disposed in the case 22 and opposed to the rear surface of the liquid crystal panel 12. The backlight unit 20 is attached to the polarizer PL2 of the liquid crystal panel 12 with the adhesive member TP. That is, the frame 56 is attached to the peripheral portion of the rear surface of the polarizer PL2 with the adhesive member TP, and the outer circumference of the frame 56 and the outer circumference of the adhesive member TP are aligned with the peripheral portion of the polarizer PL2.

The frame 56 is positioned to oppose the frame area ED of the liquid crystal panel 12, and the first and second optical sheets OS1 and OS2 and the light guide LG oppose the display area DA of the liquid crystal panel 12. The second optical sheet OS2 of the backlight unit 20 is placed to oppose the rear surface of the liquid crystal panel 12 with a gap (air layer) G therebetween by the thickness of the adhesive member TP.

As shown in FIG. 2, the circuit board of the light source unit 30 comprises a connector terminal 31. The connector terminal 31 extends outwards through a notch of the frame 5, to be connected to the first FPC 23. Thus, a drive current is allowed to flow to the light source (LED) of the light source unit 30 via the first FPC 23 and the circuit board. The light emitted from LED enters the light guide LG from the incident surface, propagates in the light guide LG or is emitted from the reflective surface of the light guide LG, and is reflected by the reflective sheet RE. Then, the reflected light once again enters the light guide LG. After passing through such an optical path, the light from the LED is emitted from the entire surface of the emission surface of the light guide LG to a liquid crystal panel 12 side. The emitted light is diffused by the first and second optical sheets OS1 and OS2, and then irradiated to the display area DA of the liquid crystal panel 12.

According to the liquid crystal display 10 configured as described above, for example, a display period, a touch detection, a display period, a force sensing period and a display period are alternately repeatedly executed a plurality of times by time division in an one-frame period. In the display period, the drive IC 24 sends a display signal to a display pixel, and in the touch detection period, supplies drive signals sequentially to the first detection electrodes Tx1 to Txn of the touch sensor. Furthermore, in the force sensing period, the drive IC 24 supplies drive signals sequentially to the first detection electrodes Tx1 to Txn.

The touch drive IC 21 receives detection signals from the second touch detection electrodes Rx1 to Rxn of the touch sensor and detects a touch and the position coordinates of the touch based on the detection signals. That is, in a touch detection period, when an operator's finger approaches or touches the cover panel 14, the capacitance between the first detection electrodes TX and the second touch detection electrodes RX varies with respect to the touch position at the center, and the touch drive IC 21 receives the detection signals which contain the variation in capacitance from the second touch detection electrodes Rx1 to Rxn. Thus, the touch drive IC 21 detects a touch and position coordinates of the touch based on the detection signals thus received.

Further, in the force sensing period, the touch drive IC 21 receives detection signals from the second force sensing electrodes formed from the bottom walls 22a of the case 22 and detects the degree of the pressing force applied, based on the detection signals. In the force sensing period, the drive IC 24 transmits sensor drive signals to the first detection electrodes Tx1 to Txn. During this state, when the operator touches the cover panel 14 with a finger or the like, the cover panel 14 and the liquid crystal panel 12 is slightly warped towards the backlight unit 20 side with respect to the pressed portion at the center by the pressing force of the touch. Due to the warping, the first detection electrodes Tx1 to Txn are displaced and moved towards the backlight unit 20 side, that is, the bottom wall (the second force sensing electrode) 22a side, thereby varying the distances between each of the first detection electrodes Tx and the second force sensing electrode (bottom wall 22a). With the variation in distance, the electrostatic capacitance between the first detection electrodes Tx and the second force sensing electrode (bottom wall) 22a is varied, and the touch drive IC 21 receives the detection signals which contain the electrostatic capacitance variation from the second force sensing electrode. The touch drive IC 21 detects the pressed state (pressing force) on the cover panel 14 based on the signals thus received. In the liquid crystal display 10, when the input of a predetermined pressing force of, for example, 0.1 to 10 N is detected by the pressure sensor described above, the drive IC 24 executes arbitrary actions such as screen switching, screen expansion and selection of a operation upon detection of the pressing force as a trigger.

On the other hand, due to the pressing force by the touch, the cover panel 14 and the liquid crystal panel 12 are slightly warped towards the backlight unit 20 side with respect to the pressed portion as the center. If this amount of warping exceeds the thickness of the air layer (gap) G between the backlight unit 20 and the liquid crystal panel 12, the liquid crystal panel 12 presses the second force sensing electrode (bottom wall) 22a via the first and second optical sheets OS1 and OS2, the light guide LG and the reflective sheet RE.

In the meantime, the amount of displacement of each of the first detection electrodes Tx1 to Txn changes according to the location of the pressing force applied. To explain, central portions of the cover panel 14 and the liquid crystal panel 12 can be relatively easily warped as compared to peripheral portions, and therefore if the pressing force of the same degree is applied, the amount of warping of the central portions is greater as compared with the amount of warping of the peripheral portions. Further, since the peripheral portions of the cover panel 14 and the liquid crystal panel 12 are supported by the frame 56 of the backlight unit 20, they cannot not be easily warped as compared to the central portions. That is, when the pressing force of the same degree is applied, the amount of bending of the peripheral portion becomes small as compared with the amount of bending of the central portion.

Figure 12:
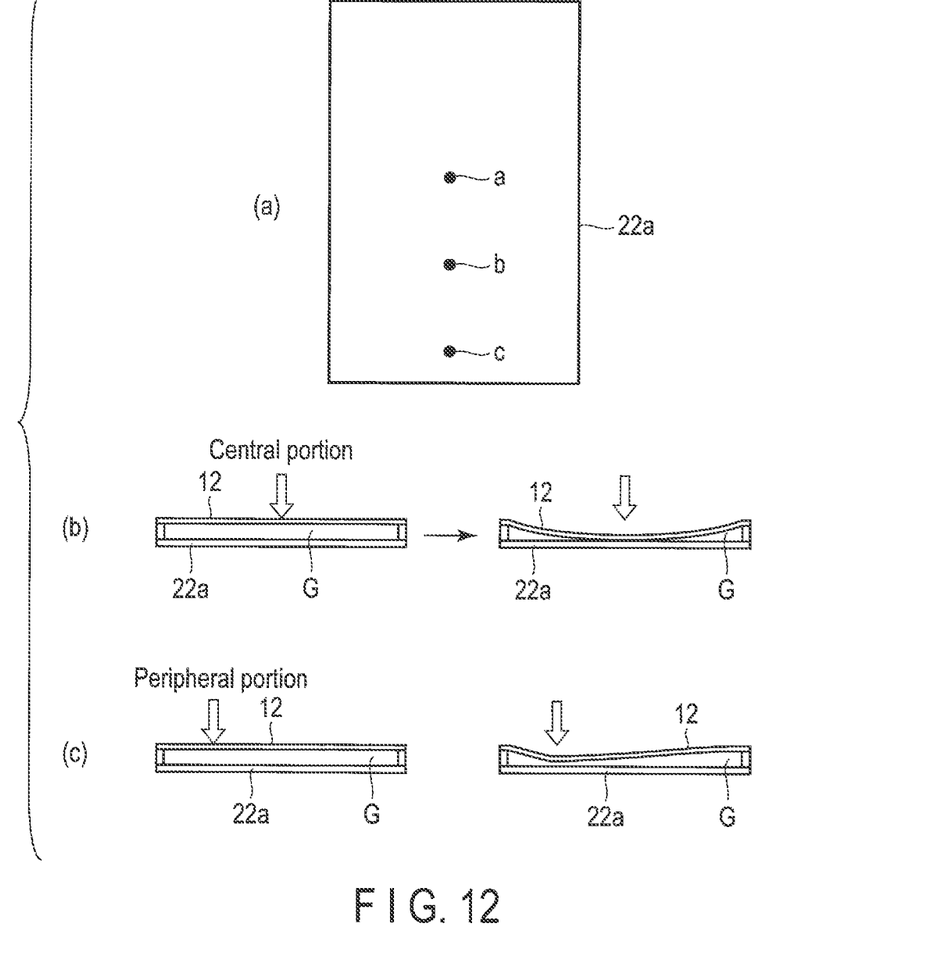
FIG. 12 is a plan view schematically showing a force sensing electrode of a display device according to a comparative example, a deformation state of the display panel when a central portion of the display panel the comparative example is pressed, and that when a peripheral part of the display panel of the comparative example is pressed.
Figure 13:
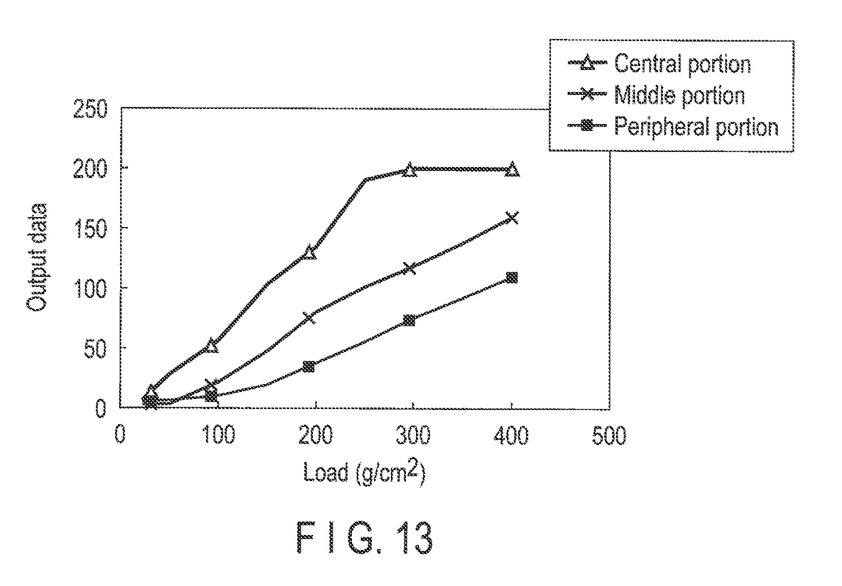
FIG. 13 is a diagram showing the relationship between the pressing force applied on the display panel and the amount of displacement of the display panel in the comparative example, as compared to each other with respect to the position where the pressing force is applied.

FIG. 12 shows a second force sensing electrode of a display device according to a comparative example, together with schematic illustrations of a warped state of the display panel when the central portion of the display panel 12 is pressed and also a warped state of the display panel when a peripheral portion of the display panel is pressed in the comparative example. FIG. 13 shows the relationship between the pressing force applied onto the display panel of the display device according to the comparative example and the detection output data (amount of displacement) for locations of application of pressing force (at three places: a central portion a, a middle portion b, and a peripheral portion c of the display panel).

As shown in FIG. 12(*a*), the second force sensing electrode 22*a* of the display device according to the comparative example is formed have a uniform thickness and uniform hardness over the entire surface without a reinforcing structure. The amount of displacement of the display panel 12 containing the first detection electrodes is varied according to the location of the pressing force applied. That is, the central portion a of the display panel 12 can be easily warped as compared to the peripheral portion c, and therefore when the pressing force of the same size is applied, the amount of warping at the central portion is greater as compared to that of the peripheral portion. Further, the peripheral portion c of the display panel 12 is supported by the frame 56 of the backlight unit 20, it cannot be easily warped as compared to the central portion a. That is, when the pressing force of the same degree is applied, the amount of warping at the peripheral portion is less as compared to that of the central portion.

If a pressing force is applied onto the central portion a of the display panel 12 as shown in FIG. 12(*b*), the central portion of the display panel 12 is warped towards the second force sensing electrode 22*a* side and first, the air layer G is crushed. Further, the central portion of the display panel 12 is displaced to be brought into contact with the second pressure sensing electrode 22*a* via the backlight unit (not shown). As shown in FIG. 12(*c*), if a pressing force is applied on the peripheral portion c of the display panel 12, the amount of displacement of the display panel 12 is less as compared to the case of the central portion, and the displacement is only a halfway to the air layer G.

As described above, the amount of displacement of the display panel 12 varies depending on the location where the pressing force is applied. More specifically, the amount of displacement in the central portion of the display panel 12 is greater as compared to that of a peripheral portion. Therefore, when a large pressing force is applied, the display panel 12 reaches the second pressure sensing electrode through the backlight unit, to allow no further displacement. As a result, it is difficult to detect a pressing force larger than this. For example, as shown in FIG. 13, in the middle portion b and the peripheral portion c of the display panel 12, the pressing force can be detected up to 400 g/cm$^2$. On the other hand, in the central portion a of the display panel 12, the maximum displacement occurs by a pressing force of load of about 300 g/cm$^2$, where it is brought into contact with the second pressure sensing electrode 22*a* via the backlight unit. Therefore, the central portion of the display panel 12 cannot be further displaced, thereby making it difficult to detect a larger pressing force than this.

By contrast, according to this embodiment, the annular rib 60*a* and the radial rib 60*b* of the reinforcing rib 60 provided on the second pressure sensing electrode (bottom wall 22*a*) are located in the peripheral portion of the second pressure sensing electrode 22*a* in plan view, whereas no reinforcing rib is provided in the central portion of the second pressure sensing electrode (22*a*) by in plan view. Thus, the interval between the central portion of the second pressure sensing electrode (22*a*) and the first detection electrodes Tx is greater as compared to that between the peripheral portion of the second pressure sensing electrode 22*a* and the first detection electrodes Tx. With this structure, the central portion of the liquid crystal panel 12 and the central portion of the backlight unit 20, which can comparatively easily deform, can be displaced to the second pressure sensing electrode (22*a*) side by the thickness (height) T2 of the reinforcing rib 60 in addition to the portion of the thickness of the air layer G, thereby making it possible to secure a relatively great amount of warpage and also bending of the first detection electrodes Tx.

Figure 5:
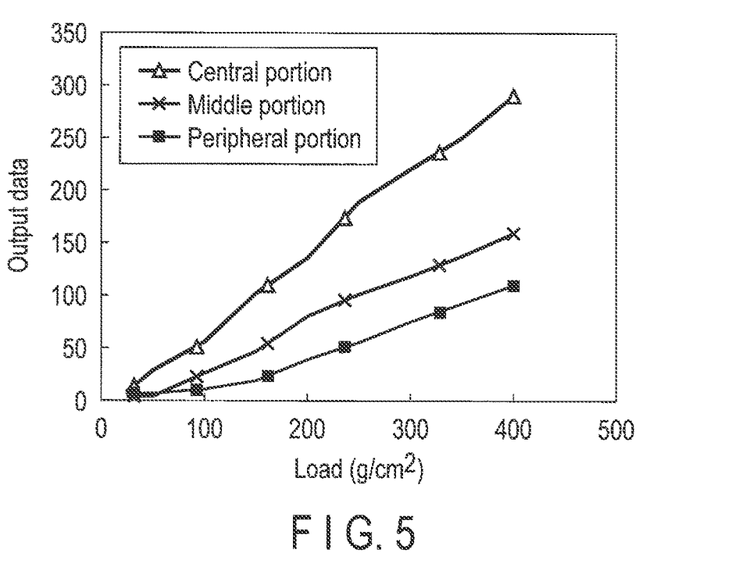
FIG. 5 is a diagram showing the relationship between a pressing force applied on a display panel of the liquid crystal display device and an amount of displacement of the display panel (output data) in a plurality of locations of application of the pressing force, as compared with each other.

FIG. 5 shows the relationship between the pressing force applied on the cover panel 14 and the amount of displacement of the first detection electrodes Tx (detection output data) in a plurality of locations of application of the pressing force (three places: the central portion a, the middle portion b, the peripheral portion c) compared to each other. In FIG. 5, the horizontal axis indicates the load (pressing force) gf and the vertical axis indicates the output data (equivalent to the amount of displacement). From this diagram, it is understood that in this embodiment, pressing force equivalent in size which can be detected in the middle portion b or the peripheral portion c can be detected also in the central portion a of the display panel 12. In other words, a sufficient displaceable amount is secured in the central portion a of the display panel 12, to be able to detect even a greater pressing force there. Thus, the pressure sensing device according to this embodiment can detect a greater pressing force over the entire area.

Furthermore, the second pressure sensing electrode (22*a*) is reinforced the reinforcing rib 60 to prevent warpage and deformation of the second pressure sensing electrode (22*a*) to the liquid crystal panel 12 side, and thus the second pressure sensing electrode can be maintained in a flat state. Thus, the interval between the second pressure sensing electrode and the first detection electrodes Tx can be maintained uniform all over the area of the second pressure sensing electrode, thereby preventing the reduction of the displaceable amount (movement stroke) of the first detection electrodes.

For example, in contrast to the pressure sensing device of the comparative example, which employs a second pressure sensing electrode formed from a 0.3 mm-thick stainless steel and a 0.4 mm-thick air layer G, this embodiment can employ a second pressure sensing electrode having a thickness T1 of 0.1 mm, a reinforcing rib 60 having a height T2 of 0.2 mm and an air layer G having a thickness of 0.2 mm, still to be able to perform equivalent pressing force detection to that of the pressure sensing device of the comparative example. In other words, the display device of this embodiment, even if the thickness of the air layer G is half of that of the comparative example, can perform pressing force detection equivalent to that of the comparative example. Therefore, the thickness of the display device as a whole can be reduced by the thinned portion of the air layer G.

As described above, according to this embodiment, it is possible to provide a display device which can precisely detect the pressing force over the entire area and still can reduce the thickness of the device as a whole.

Next, cases of display devices according to modifications and display devices of other embodiments will be described. In the modifications and embodiments described below, the same structural parts as those of the above-described first embodiment will be designated by the same referential symbols, and detailed descriptions therefor will be omitted or abbreviated. Mainly, different aspects from those of the first embodiment will be explained in detail.

(First Modification)

The reinforcing rib provided in the second pressure sensing electrode is not limited to that of the first embodiment described above, but may be formed into various shapes.

Figure 6:
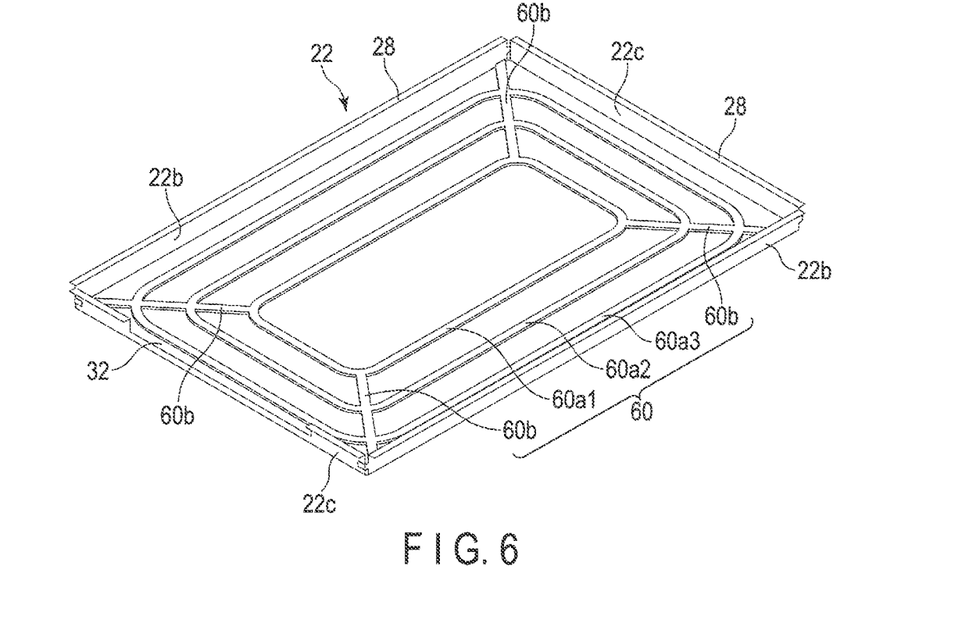
FIG. 6 is a perspective view showing the case of a liquid crystal display according to a first modification.

FIG. 6 shows the case of a display device according to the first modification. A case 22 includes a rectangular bottom wall 22a which constitutes a second pressure sensing electrode. According to the first modification, a reinforcing rib 60 provided in the bottom wall 22a comprises, for example, a rectangular first annular rib 60a1 provided in a central portion of an inner surface of the bottom wall 22a (inner surface opposing the liquid crystal panel 12), a rectangular second annular rib 60a2 provided on an outer circumferential side of the first annular rib 60a1, a rectangular third annular rib 60a3 provided on an outer circumferential side of the second annular rib 60a2, and a plurality of radial ribs 60b extending linearly from four corners of the first annular rib 60a1 in radial directions to corner portions of the bottom wall 22a through the second annular rib 60a2 and the third annular rib 60a3, all in plan view. When a thickness T1 of the bottom wall 22a is 0.1 mm, the reinforcing rib 60 has a height (thickness) T2 of about 0.1 to 0.2 mm.

The reinforcing rib 60 may be formed integrally with the bottom wall 22a as one body from a common metal with that of the bottom wall 22a by pressing, etching or the like, or they may be formed as separate bodies from a metal or a synthetic resin, and laid and adhered onto the bottom wall 22a. Moreover, the reinforcing rib 60 may be formed by printing resin on the inner surface of the bottom wall 22a.

With the reinforcing rib 60 described above, the peripheral portion of the bottom wall 22a can be reinforced to suppress warpage or deformation of the bottom wall 22a. The reinforcing rib 60 is not formed in the central portion of the bottom wall 22a, and therefore the interval between the liquid crystal panel 12 and the central portion of the bottom wall 22a can be reserved larger as compared with the portion of the reinforcing rib 60. Thereby, an advantageous effect similar to that of the first embodiment described above can be obtained also in first modification.

(Second Modification)

Figure 7:
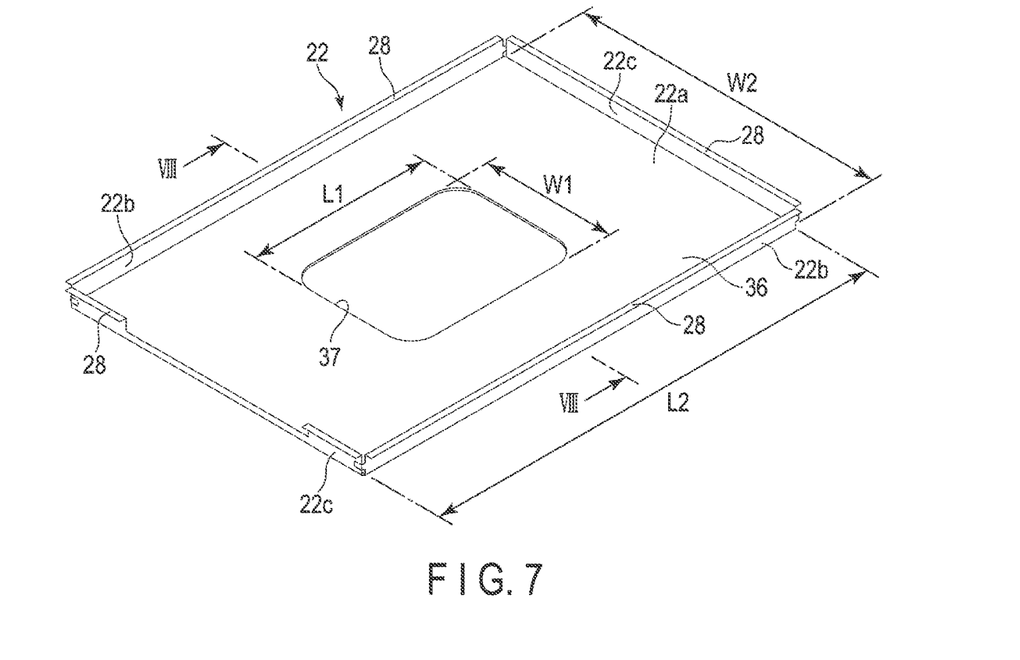
FIG. 7 is a perspective view showing the case of a liquid crystal display according to a second modification.
Figure 8:
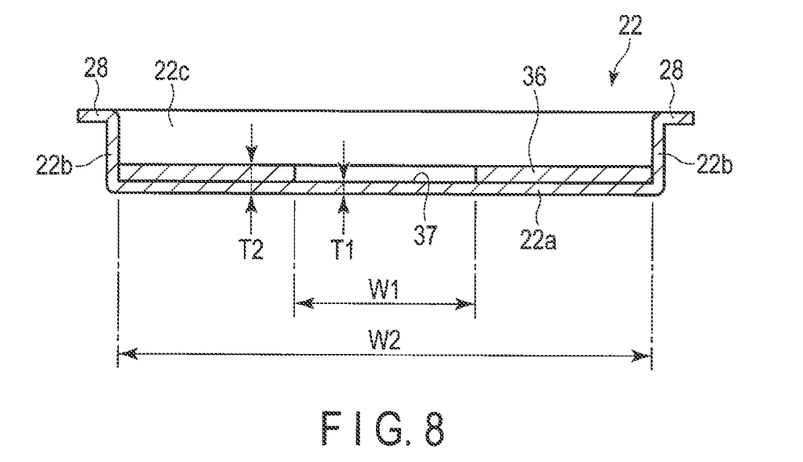
FIG. 8 is a cross section of the case taken along line VIII-VIII of FIG. 7.

FIG. 7 shows a case of a display device according to the second modification, and FIG. 8 is a cross section of the case taken along line VIII-VIII of FIG. 7.

According to the second modification, as a reinforced structure of a second pressure sensing electrode, a thickness T2 of a peripheral portion of a second pressure sensing electrode (bottom wall 22a) is set greater than a thickness T1 of a central portion thereof. For example, the thickness T2 of the bottom wall 22a is 0.3 mm, and a 0.2-mm-deep rectangular, elliptical or circular recess 37 is formed in the central portion of the bottom wall 22a. Thus, the thickness T1 of the central portion of the bottom wall 22a is set to 0.1 mm. Dimensions of the recess 37 can be set as needed and in this modification, for example, a length L1 of the recess 37 is set to about 50% of a width W2 of the bottom wall 22a and a width W1 of recess 37 is set to about 50% of a length L2 of the bottom wall 22a.

In this modification, an annular reinforcing plate 36 comprising a rectangular hole equivalent to recess 37 in a central portion thereof is overlaid or fixed on the bottom wall 22a, thus forming the second pressure sensing electrode with a thick peripheral portion and a thin central portion. In this case, the thickness T1 of the bottom wall 22a is set 0.1 mm, and the thickness of the reinforcing plate 36 is set to 0.2 mm.

The structure is not limited to that described above, but a 0.2-mm-deep recess 37 may be formed by pressing or etching in a central portion of the bottom wall 22 having a thickness T1 of 0.3 mm.

With the structure described above, the peripheral portion of the bottom wall 22a can be reinforced to suppress warpage or deformation of the bottom wall 22a. Further, the recess 37 is not formed in the central portion of the bottom wall 22a in plan view, and therefore the interval between the liquid crystal panel 12 and the central portion of the bottom wall 22a, i.e., the interval between the first detection electrodes Tx and the bottom wall 22a, can be reserved larger as compared with the peripheral portion of the bottom wall 22a. Thereby, an advantageous effect similar to that of the first embodiment described above can be obtained also in the second modification.

Second Embodiment

Figure 9:
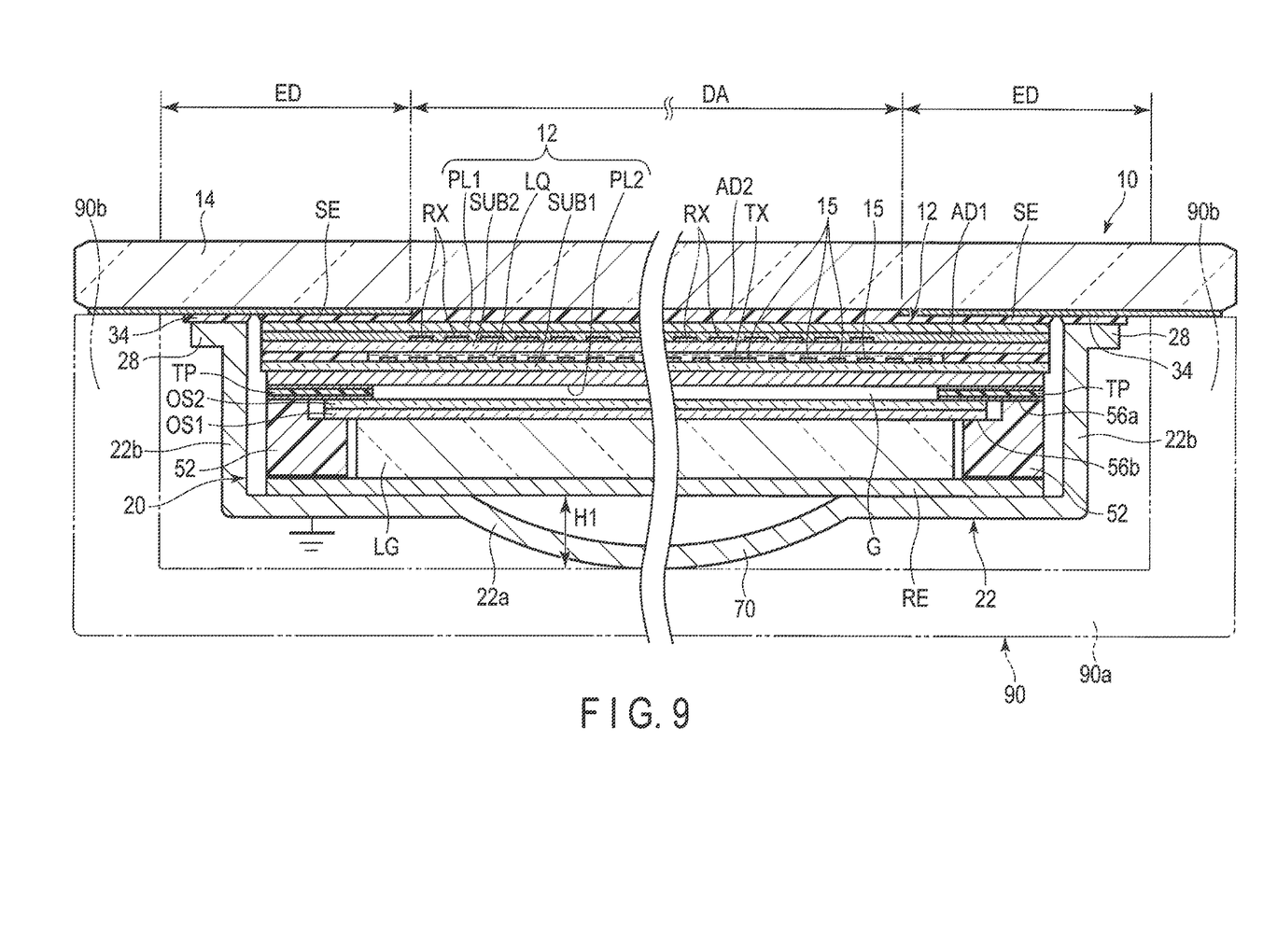
FIG. 9 is a cross section of the liquid crystal display according to a second embodiment.
Figure 10:
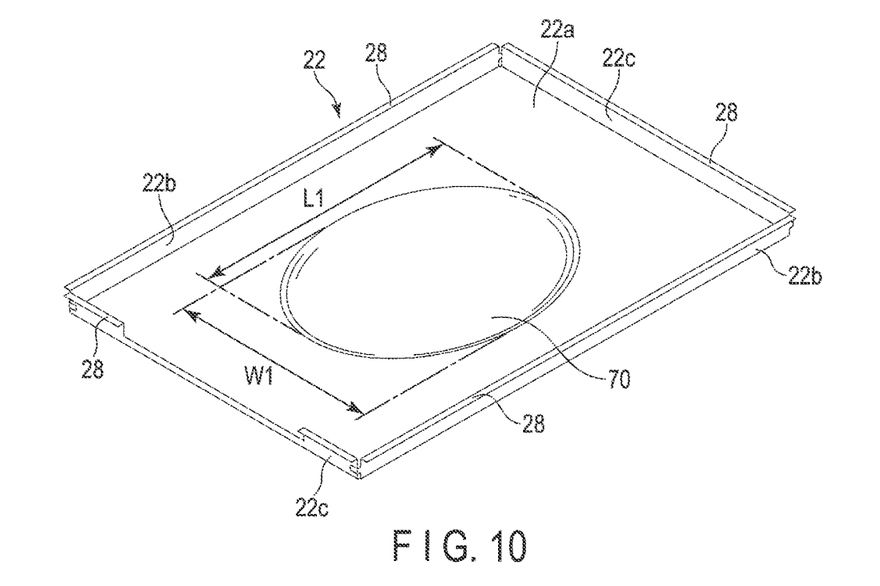
FIG. 10 is a perspective view showing a case of the liquid crystal display device according to the second embodiment.

FIG. 9 is a cross section of a liquid crystal display according to the second embodiment and FIG. 10 is a perspective view of a case of the liquid crystal display according the second embodiment.

As shown in these figures, according to this embodiment, a bottom wall 22a of a case 22 which constitutes a second pressure sensing electrode comprises a circular projecting portion whose portion which includes at least a central portion, projects downward, i.e., a direction separating from the liquid crystal panel 12. In this embodiment, a projecting portion 70 is formed into a bowl shape whose cross section parallel to the bottom wall 22a is elliptical, and which is curved toward the lower side. Further, the projecting portion 70 is provided in a central portion of the bottom wall 22a in plan view. A length L1 and a width W1 of the projecting portion 70 are respectively set to about 50% of those of the bottom wall 22a. A projecting height H1 of the central portion of the projecting portion 70 from a flat surface of a peripheral portion of the bottom wall 22a is set to about 0.5 mm, for example. The projecting portion 70 with such a structure is formed by, for example, subjecting the bottom wall 22a to pressing.

With the above-described structure, in which the peripheral portion of the bottom wall 22a is flattened and the projecting portion 70 is formed in the central portion of the bottom wall 22a as a reinforced structure, the rigidity of the bottom wall 22a can improve, thereby suppressing the warping or deformation of the bottom wall 22a. Further, since the projecting portion 70 projects in the direction away from the liquid crystal panel 12, the interval between the liquid crystal panel 12 and the central portion of the bottom wall 22a, i.e., the interval between the first detection electrodes Tx and the bottom wall 22a, can be reserved larger as compared with the peripheral portion of the bottom wall 22a.

As shown in FIG. 9, the reflective sheet RE of the backlight unit 20 is laid on the flat peripheral portion of the bottom wall 22a. Further, the liquid crystal display 10 is mounted to a set-side housing 90 formed by the synthetic resin is equipped with, for example. The set-side housing 90 is disposed to cover the case 22. The set-side housing 90 comprises a bottom wall 90a opposing the bottom wall 22a of the case 22 and a plurality of side walls 90b fixed to the cover panel 14. In this embodiment, the projecting portion 70 provided on the bottom wall 22a of the case 22 may be brought into contact with the bottom wall 90a of the set-side housing 90.

According to the second embodiment with the above-described structure, the peripheral portion of the bottom wall 22a is reinforced and warping or deformation of the bottom wall 22a can be controlled. Further, the projecting portion 70 is formed in the central portion of the bottom wall 22a in plan vie. With this structure, the interval between the liquid crystal panel 12 and the central portion of the bottom wall 22a, i.e., the interval between the first detection electrodes Tx and the bottom wall 22a, can be reserved larger as compared with the peripheral portion of the bottom wall 22a. Thereby, an advantageous effect similar to that of the first embodiment described above can be obtained also in the second embodiment.

(Third Modification)

Figure 11:
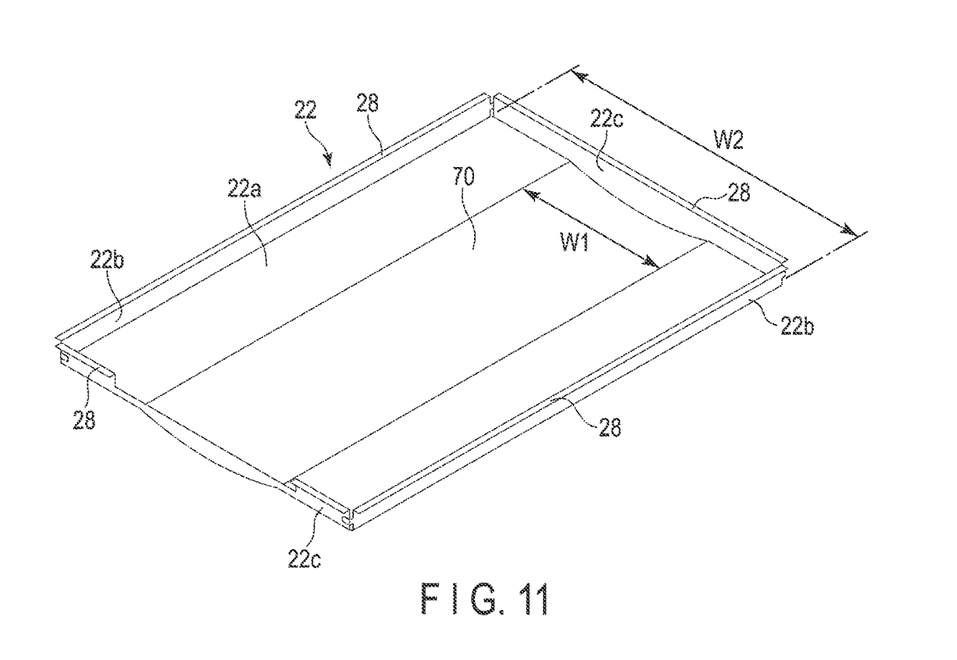
FIG. 11 is a perspective view showing a case of the liquid crystal display device according to a third modification.

FIG. 11 is a perspective view showing a case of a display device according to the third modification.

In the second embodiment described above, the shape of the projecting portion 70 provided on the bottom wall 22a of the case 22 is not limited to elliptical, but may be selected from various shapes such as rectangular, circular and others.

As shown in FIG. 11, according to the third modification, the projecting portion 70 is formed into an arc shape extending coaxially along the longitudinal central line of the bottom wall 22a. The projecting portion 70 is formed into a belt-like shape extending from one short side of the bottom wall 22a to the other side and extends parallel to one side edge of the bottom wall 22a, for example, a side edge of a long side. For example, a width W1 of the projecting portion 70 is set to about 50% of a width W2 of the bottom wall 22a. The peripheral portions of the bottom wall 22a, located on both sides of the projecting portion 70 along the width direction thereof, are both formed flatness.

With the second pressure sensing electrode configured as above, an advantageous effect similar to that of the second embodiment described above can be obtained.

In the third modification, the projecting portion 70 may be formed into an arc-shape extending coaxially with a central line of the bottom wall 22a of the bottom wall 22a along the width direction thereof.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Based on the structures which have been described in the above-described embodiment and variations, a person having ordinary skill in the art may achieve structures with arbitral design changes; however, as long as they fall within the scope and spirit of the present invention, such structures are encompassed by the scope of the present invention. Furthermore, regarding the present embodiments, any advantage and effect those will be obvious from the description of the specification or arbitrarily conceived by a skilled person are naturally considered achievable by the present invention.

The external and internal shapes of the structural members of the liquid crystal panel and the backlight unit are not limited to a rectangle. One or both of them may be polygonal, circular, elliptical or combination of any of these in plan view. The materials or dimensions of the structural members are not limited to those described in the examples provided above, and may be selected from various types.

The display panel is not limited to a transmissive type, but other display panels such as of a transreflective type and an organic EL type may be adopted as well.

What is claimed is:

1. A display device comprising:
   a display panel comprising a first substrate including a display area and a first detection electrode; and
   a case formed of a metal and including a bottom wall which constitutes a second force sensing electrode opposing the display area and the first detection electrode with a gap therebetween, and the second force sensing electrode comprising a central portion opposing a central portion of the display area and bent to form a projection projecting in a direction away from the display panel and the first detection electrode, a peripheral portion formed flat and located to surround the central portion, and a reinforcing structure which reinforces the peripheral portion, the gap between the central portion and the first detection electrode being greater than a gap between the peripheral portion and the first detection electrode, wherein the projection forms the reinforcing structure.

2. The display device of claim 1, wherein
   the reinforcing structure comprises a reinforcing rib on the peripheral portion of the second force sensing electrode.

3. The display device of claim 2, wherein
   the reinforcing rib comprises an annular rib provided around the central portion and a plurality of radial ribs extending respectively from the annular rib to respective side edges of the peripheral portion.

4. The display device of claim 2, wherein
   the reinforcing rib comprises a first annular rib provided around the central portion, a second annular rib provided around the first annular rib, and a plurality of radial ribs extending respectively from the first annular rib via the second annular rib to respective side edges of the peripheral portion.

5. The display device of claim 1, wherein,
   the second force sensing electrode comprises a recess formed in the central portion, and a thickness of the peripheral portion is greater than that of the central portion.

6. The display device of claim 5, wherein
   the reinforcing structure comprises a reinforcing plate comprising a hole in the central portion to form the recess and overlaid on the peripheral portion of the second force sensing electrode.

7. The display device of claim 1, wherein
   the projection has a circular or elliptical cross section, and projects curvedly in a direction away from the display panel.

8. The display device of claim 1, wherein
   the projection has a belt-shape or curved shape and extends parallel to one side edge of the second force sensing electrode.

9. The display device of claim 1, wherein
   the display panel comprises a second substrate opposed to the first substrate with a gap therebetween, and a liquid crystal layer between the first substrate and the second substrate,
   the second force sensing electrode is disposed to oppose the first substrate, and
   which further comprises a backlight device between the first substrate and the second force sensing electrode.

10. The display device of claim 9, wherein
the backlight device comprises a reflective sheet on the second force sensing electrode, a light guide on the reflective sheet, and an optical sheet on the light guide to oppose the first substrate with a gap therebetween.

11. The display device of claim 9, wherein
the reinforcing structure comprises a reinforcing rib on the peripheral portion of the second force sensing electrode.

12. The display device of claim 9, wherein
the second force sensing electrode comprises a recess formed in the central portion, and a thickness of the peripheral portion is greater than that of the central portion.

* * * * *